Patented Oct. 31, 1950

2,528,417

UNITED STATES PATENT OFFICE 2,528,417

EPOXY ETHER COMPOSITIONS CONTAINING PHENOLIC PITCH

Theodore F. Bradley, Oakland, Calif., assignor to Shell Development Company, San Francisco, Calif., a corporation of Delaware No Drawing. Application January 25, 1949, Serial No. 72,770

6 Claims. (Cl. 260—28)

This invention relates to a composition of matter particularly adapted for use as a surface coating material, adhesive or molding composition.

The composition of the invention contains two essential ingredients. One is an ether containing epoxy groups so as to have a 1,2-epoxy equivalency greater than 1 and the other is a higher-boiling aqueous alkali extract of cracked petroleum, the principal constituents of which are higher alkyl phenols. By incorporating the petroleum extract with the epoxy-containing ether, a number of useful objectives are achieved. The epoxy-containing ether is of such nature that with a curing agent therefor (explained more fully hereinafter) it is capable of forming a resinous material having valuable properties. However, conventional dyestuffs are unsuitable for use with it for obtaining colored surface coating materials. By incorporating the petroleum extract with the epoxy-containing ether, a composition is obtained which after curing has a golden to yellowish brown color particularly desired for use as a protective coating on tin-plated food containers (tin cans). Moreover, it has been found that with normally solid epoxy ethers the petroleum extract imparts qualities which enable the composition to flow properly under heat in molding and extrusion operations.

The epoxy ethers employed in the composition of the invention contain, along with the ethereal oxygen, glycidyl groups in such quantity that the material has a 1,2-epoxy equivalency which is greater than 1. By the epoxy equivalency reference is made to the average number of 1,2-epoxy groups

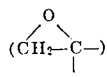

contained in the average molecule of the ether. In the case where a substantially pure simple compound is used, the epoxy equivalency will be an integer of two or more. For example, the epoxy equivalency of diglycidyl ether or of the diglycidyl ether of ethylene glycerol is two, while that of triglycidyl ether of glycerol is three. However, the glycidyl ether may be a mixture of chemical compounds which, although they are of similar identity and chemical constitution, have different molecular weights. The measured molecular weight of the mixture upon which the epoxy equivalency is dependent will necessarily be an average. Consequently, the epoxy equivalency of the glycidyl ether mixture will not necessarily be an integer of two or more, but will be a value which is greater than one. For example, a glycidyl ether particularly suitable for use in the invention is that made by reacting bis-(4-hydroxyphenyl)-2,2-propane with epichlorhydrin in the presence of an alkali at a mole ratio of about 1.4 mols of epichlorhydrin per mol of the dihydric phenol. The product is a solid resinous mixture of glycidyl ethers for a measured average of molecular weight of 791. Analysis shows the product to contain about 0.169 equivalents of epoxy groups per 100 grams. Consequently, the product has an epoxy equivalency of about 1.34, i. e. an average of about 1.34 epoxy groups per molecule.

The glycidyl ethers used in the invention preferably contain only the elements carbon, hydrogen and oxygen. They include 1,2-epoxy-containing polyethers of polyhydric alcohols such as polyglycidyl ethers thereof like the diglycidyl ether of ethylene glycol, propylene glycol, trimethylene glycol, diethylene glycol, triethylene gycol, glycerol, dipropylene glycol and the like. Other typical ethers of this class include glycidyl ethers of polyhydric alcohols having a 1,2-epoxy equivalency greater than one such as the polyglycidyl ethers of glycol, diglycerol, erythritol, pentaglycerol, mannitol, sorbitol, polyallyl alcohol, polyvinyl alcohol, and the like. The polyglycidyl polyethers of the polyhydric alcohols are prepared by reacting the polyhydric alcohol with epichlorhydrin in the presence of about 0.1 to 2% of an acid-acting catalyst such as boron trifluoride, hydrofluoric acid or stannic chloride, whereby the chlorhydrin ether is formed as product. The reaction is effected at about 50 to 125° C. with the proportions of reactants being such that there is about 1 mol of epichlorhydrin for each molecular equivalent of hydroxyl group in the polyhydric alcohol. Thus, in preparing the ether of glycerol, which polyhydric alcohol contains three hydroxyl groups in each mol thereof, about three mols of epichlorhydrin for each mol of glycerol are used. The resulting glycidyl ether from the reaction of a polyhydric alcohol with epichlorhydrin is then dehydrochlorinated by heating at about 50 to 125° C. with a small, say 10%, stoichiometrical excess of a base. For this purpose, sodium aluminate gives good results.

A preferred group of epoxy ethers for use in the invention is prepared by reacting a dihydric phenol with epichlorhydrin in alkaline solution. These products are of resinous character and in general are solid materials at normal temperature (20–30° C.). Any of the various dihydric phenols are used in preparing these glycidyl ethers including mononuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl phenyl)-2,2-propane, bis-(2-dihydroxynaphthyl)-methane, 1,5-dihydroxy naphthalene, etc.

The glycidyl ethers of the dihydric phenols are prepared by heating at 50 to 150° C. The dihydric phenol with epichlorhydrin using 1 to 2 or more mols of epichlorhydrin per mol of dihydric phenol. Also present is a base such as sodium, potassium, calcium or barium hydroxide in amount of about 10 to 30% stoichiometric excess of the epichlorhydrin, e. g. 1.1 to 1.3 equivalents of base per mol of epichlorhydrin. In effecting the reaction, the dihydric phenol is mixed with an aqueous solution of the base and heated. The epichlorhydrin is then added rapidly to the stirred reaction mass. The initial reaction is somewhat exothermic so that the temperature will rise to some extent, but then heating is applied while stirring whereupon the taffy-like resinous polyether forms. While still hot, the reaction product is washed with water until free of base.

The resulting resinous polyether is a complex mixture rather than being a single chemical compound. The principal product may be represented by the formula

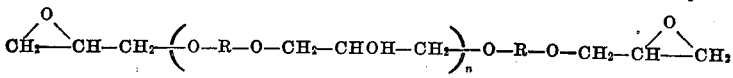

wherein $n$ is an integer preferably of 1 to 7 such as 4 and R represents the divalent hydrocarbon radical of the dihydric phenol. The length of the chain (the value of $n$) can be made to vary by changing the molecular proportions of epichlorhydrin to dihydric phenol in preparing the epoxy ether. Thus, by decreasing the mols of epichlorhydrin per mol of dihydric phenol from about 2 downwards toward 1 the molecular weight, the softening point and the epoxy equivalency are increased. In general, these glycidyl ethers having epoxy equivalency between 1 and 2 contain terminal 1,2-epoxy groups and have alternate aliphatic and aromatic groups linked together by ethereal oxygen atoms.

The coloring and flow producing ingredient of the composition is a high-boiling, semi-liquid to solid caustic extract of cracked petroleum oil, or coal tar distillate. This material contains high-boiling alkyl phenols as the principal constituent, and due to the thick tenacious nature thereof and its contents, may conveniently be referred to as phenolic pitch.

Various petroleum fractions contain widely different amounts of the alkyl phenols. Most straight run oils contain very little, if any, while cracked oils contain appreciable amounts of the alkyl phenols. The phenols are formed by the cracking operation which need not be of any particular type. Thus, both thermally and catalytically cracked petroleum oils are suitable sources of the material employed by the composition of the invention. Petroleum oil may be subjected to heating whereby pyrolysis in the absence of a catalyst occurs. Or if desired, petroleum may be subjected to contact while heated with various catalytic materials such as montmorillonite-type clay, synthetic silica-alumina composites, manganese-silica composites, and silica gel cracking catalysts. The aforementioned cracked petroleum oils are so well known in the art that elaboration on details of their preparation is unnecessary.

The cracked petroleum subjected to the extraction process with caustic is ordinarily a distillate fraction or fractions boiling at from about 90 to 350° C. although it need not be exclusively such material, i. e. higher or lower-boiling material may also be present, but since the desired material is contained in the cracked oil of this boiling range best efficiency is obtained by not having high amounts of other material present.

The extraction of the cracked oil is effected in usual fashion by contacting with aqueous caustic containing 35 to 50% NaOH or other suitable base at temperatures of 15 to 40° C. The extraction may be accomplished in continuous manner whereby a stream of the cracked oil is mixed and agitated with the caustic solution and then the two phases are permitted to separate with either withdrawal of the caustic, or recirculation for additional contact with fresh cracked oil. In this manner, the phenolic constituents contained in the cracked oil are removed as alkali phenolates in the caustic.

The extraction operation tends to also remove from the cracked oil a small amount of hydrocarbons and other materials which may desirably be removed from the extract by distillation or blowing with steam. Thus, the crude caustic extract may be subjected to steaming with substantially saturated steam to drive off the aforementioned impurities. In some cases a sludge precipitates during the steaming. This may be separated upon completion of the steaming operation by decanting the extract therefrom.

The phenolic extract is sprung from the caustic by contact with an acidic substance. While various water-soluble, strong inorganic acids such as HCl, H₂SO₄ or H₃PO₄ may be employed for this purpose, it is ordinarily most convenient to spring the extract with carbon dioxide. For this purpose, flue gas, which ordinarily contains about 2 to 15% carbon dioxide, is a cheap and convenient source. The carbon dioxide is passed into the caustic and the alkyl phenols separate therefrom as another liquid phase which is removed. The crude phenolic extract is subjected to distillation under vacuum in order to obtain the desired phenolic pitch. Preferably the crude material is flash distilled under a pressure below about 25 mm. mercury. Lower boiling material from the distillation is not desired for use in the composition of the invention. Rather, it is the very high boiling or residuum which is used in the composition, namely, that material boiling at 250° C. (760 mm.) and upward. The phenolic pitch thus constitutes the portion or fraction of the distillate boiling at 250° C. and higher together with the distillation bottoms or residuum. The whole of that part of the phenolic extract which is the phenolic pitch employed in the invention will contain in part some material which is liquid and another part which is solid. In general, it is preferred not to use solid material having a ring and ball softening point in water above 100° C. Further details on methods for obtaining the cracked petroleum alkyl phenols used as a source of the phenolic pitch are contained in U. S. Patents 2,163,227 and 2,203,217 although the present invention is not necessarily limited to such detailed methods.

Unlike hydrocarbon pitches and asphalts, phenolic pitch is miscible in all proportions with ethanol or isopropanol. Such solubility enhances its utility.

The phenolic pitch may be incorporated into the epoxy ether by any suitable manner such as fusing or hot milling. Various amounts of the phenolic pitch may be employed with the epoxy ethers. The particular proportion of pitch contained therein will ordinarily be dependent upon the properties desired or use to which the composition is put. When the pitch is employed as coloring material small proportions are suitable such as from about 1 to 20% although the composition may contain larger or smaller proportions if desired. Since the pitch enables excellent hot flow properties in molding and extrusion operations with the epoxy ether resins, fairly large proportions may be employed for this purpose such as up to about 50% of the composition. The epoxy ethers which are solid at normal temperatures of 20 to 30° C. are excellent materials for use as cold-setting adhesives. However, for this purpose it is necessary that some fluidizing material be present in order that the composition has spreadable consistency while cold. Such consistency is attained in the composition of the invention by employing the separated liquid fraction of the crude phenolic pitch as the fluidizing material for use with the normally solid epoxy ether. In such cases best strengths for the cured adhesive are obtained with use of about 20 to 40% of the phenolic pitch constituent in the composition.

The composition of the invention is cured by the action of a non-neutral agent. For this purpose small amounts of alkaline substances such as sodium hydroxide, potassium hydroxide, sodium phenoxide, or amines like ethylene diamine, diethylene triamine, or diacetone diamine are suitable. When acidic substances are employed it is preferable that they contain a plurality of acidic groups such as is the case with dicarboxylic acids or their anhydrides, phosphoric acid, and butyl dihydrogen phosphate. Various amounts of the non-neutral curing agents are employed in the composition but ordinarily about 1 to 10% is suitable. The composition is cured either by simple addition of the curing agent thereto or by also heating such as at 50 to 200° C.

Various other ingredients may be incorporated in the composition of the invention such as solvents and/or fillers like finely divided pigments or clay.

For the purpose of illustrating the invention in detail, the following examples are given wherein the parts are by weight.

*Example I*

An epoxy ether resin was prepared by reacting 2.04 mols of epichlorhydrin with 1 mol of bis-(4-hydroxyphenyl)-2,2-propane (known to those skilled in the art as bis-phenol) in the presence of 2.14 mols of sodium hydroxide (5% excess). The resin was obtained by preparing a solution with 2280 parts of water, 245 parts of sodium hydroxide and 640 parts of bis-phenol. This solution in a reaction vessel fitted with a stirrer was heated to about 45° C. whereupon 530 parts of epichlorhydrin were rapidly added while agitating the reaction mixture. In about 50 minutes, the temperature of the reaction mixture, without application of external heat, rose to about 95° C. from the exothermic heat of reaction. As the resin formed, the reaction mixture separated into a two phase system consisting of an aqueous phase and a molten taffy-like resin phase. About 80 minutes after the epichlorhydrin was added, the aqueous layer was removed and the molten resin was washed continuously with hot water until the wash water was neutral to litmus. Then the water was drained from the resin and the resin heated at about 140° C. with agitation until dry. The molten resin was cooled and flaked.

The resulting resin had a melting point of 43° C. by the Durran's mercury method and a molecular weight of 510 measured ebullioscopically in ethylene dichloride. The 1,2-epoxy equivalency of the resin was 0.326 equivalents per 100 grams so the resin contained 1.66 epoxy groups per molecule. The epoxide value was determined by heating a weighed sample of the resin with an excess of 0.2N pyridinium chloride chloroform solution at the boiling point under reflux for 2 hours whereby the pyridinium chloride hydrochlorinates the epoxy groups to chlorhydrin groups. After cooling, the excess pyridinium chloride is back titrated with 0.1N sodium hydroxide in methanol to the phenolphthalein end point. This method was used for obtaining all epoxide values discussed herein.

*Example II*

Another epoxy ether resin was prepared in the same manner as described in Example I except that different proportions of reactants were employed. There were reacted 1.8 mols of epichlorhydrin with 1 mol of bis-phenol in the presence of 2.16 mols of sodium hydroxide (20% excess) as a 10.6% aqueous solution.

The resulting resin had a Durran's mercury method melting point of 60° C. and a molecular weight by ebullioscopic measurement in ethylene dichloride of 920. The 1,2-epoxy value was 0.194 equivalents per 100 grams.

*Example III*

A third epoxy resin was prepared by reacting 1.22 mols of epichlorhydrin with 1 mol of bis-phenol in the presence of 1.37 mols of sodium hydroxide (12.5% excess) as a 9% aqueous solution, the reaction being effected as described in Example I.

The resin had a melting point of 100° C. by the Durran's mercury method and the molecular weight was 1415 by ebullioscopic measurement in ethylene dichloride. The 1,2-epoxy value was 0.116 equivalents per 100 grams.

*Example IV*

An epoxy resin of still higher molecular weight and softening point was prepared by reacting the resin obtained as described in Example III with an added 5% of bis-phenol. A portion of the Example III resin was melted and heated to 150° C. whereupon the added 5% of bis-phenol was mixed therewith. The reaction mixture was then heated so as to gradually increase the temperature thereof to 190° C. in 25 minutes, which temperature was maintained for an additional 1½ hours to complete the reaction. The resin was then cooled and flaked.

The resulting resin had a Durran's mercury method melting point of 131° C. and a molecular weight of 2560 (ebullioscopic in ethylene dichloride). The 1,2-epoxy equivalency was 0.059 equivalents per 100 grams.

Example V

The phenolic extract was prepared by contacting untreated cracked California petroleum distillate boiling at 200 to 650° F. with 40° Bé. caustic soda in continuous manner using about 0.1 barrel of caustic per barrel of distillate whereby there was obtained crude extract containing about 40% of acid oils. The crude extract was then diluted with an equal volume of water and steam distilled so as to remove a small amount of neutral oil which was discarded. Flue gas containing about 8% carbon dioxide was then dispersed through the extract so as to spring the acid oils, which were removed by gravitational separation. The crude acid oils were next subjected to vacuum distillation at 5 mm. Hg pressure whereby there was separated a fraction amounting to 4% of the charge which boiled at 250 to 330° C. (Extract A) and 10% of a residual pitch (Extract B).

Extract A was a dark colored, viscous material of phenolic odor having the following properties:

| | |
|---|---|
| Specific gravity 20/4 | 1.035 |
| Viscosity at 210° F _____centipoises__ | 5.3 |
| Viscosity at 100° F _____centipoises__ | 103.3 |
| Carbon _____percent__ | 78.9 |
| Hydrogen _____percent__ | 9.0 |
| Nitrogen _____percent__ | 2.0 |
| Sulfur _____percent__ | 0.3 |
| Acetyl value | 0.502 |
| Solubility in dilute aqueous caustic solution | Complete |

Extract B was a soft, black pitch of the following properties:

| | |
|---|---|
| Specific gravity, 20/4 | 1.101 |
| Ring & Ball softening point in H$_2$O __°C__ | 41.4 |
| Viscosity at 210° F _____centipoises__ | 564 |
| Molecular weight | 285 |
| Acid No. | 77 |
| Carbon _____percent__ | 77.9 |
| Hydrogen _____percent__ | 8.26 |
| Nitrogen _____percent__ | 1.47 |
| Sulfur | 1.04 |
| Miscibility in ethanol | Complete |
| Miscibility in isopropanol | Complete |

Example VI

About 80 parts of the epoxy resin of Example II were fused at 150° C. for 10 minutes with 10 parts of Extract B (see Example V). A 50% solution of the fused product was prepared in a solvent mixture containing equal volumes of xylene and the acetate of the methyl ether of ethylene glycol, and 15% of 2,4-diamino-2,4-diamono-2-methylpentane, based on the resin content, was added. The solution was spread on glass and on tin-plated sheet steel so as to give films about 1 mil thick. These were then baked at 150° C. for 1 hour. The films were tough and not softened when contacted with toluene which indicated that they were well cured. The color of the films was a clear light brown. There was no sign of incompatibility.

Example VII

About 80 parts of the epoxy resin of Example III were fused with 10 parts of Extract B at 150° C. for 10 minutes. A 50% solution of the fused resin was prepared in the solvent mixture described in Example VI. To the solution was added 5% of 2,4-diamino-2-methylpentane based on the resin content. Films were prepared as before and baked at 150° C. for 1 hour. The films were again well cured, and there was no sign of incompatibility. The color was the same clear, light brown.

Example VIII

About 80 parts of the epoxy resin of Example IV were mixed (not fused) with 10 parts of Extract B and a 40% solution thereof prepared in the solvent containing equal parts by volume of xylene and methyl cellosolve acetate. About 2- of the curing agent, 2,4-diamino-2-methylpentane was added, the percentage being based on the resin content. Films were prepared as described in Example VI and baked at 150° C. for 1 hour. The films were well cured, were the same light brown color, and there was no indication of incompatibilty. The films were the smoothest and had the best appearance of those described to this point in these examples.

Example IX

In order to test the compatibility of larger proportions of the extracts with the epoxy resins, two additional compositions were prepared. In one, equal parts of the epoxy resin of Example IV and Extract A were dissolved to make a 50% solution in methyl ethyl ketone. In the other, equal parts of the Example IV epoxy resin and Extract B were dissolved to make a 50% solution in equal parts by volume of toluene and methyl ethyl ketone. Each solution was then spread on glass panels with a doctor blade so as to give a film of 2 mils thickness after evaporation of the solvent. The films were baked at 70° C. for 1 hour. Each film was clear and gave no indication of incompatibility.

Example X

Tests were made of the suitability of the normally liquid extract as a diluent for normally solid epoxy resin so as to obtain a spreadable composition for use as an adhesive. Compositions were prepared containing the proportions noted in the table below of Extract A and the epoxy resin of Example I by warming the constituents and mixing. After cooling, 5% (on the resin content) of diethylene triamine as curing agent was added to the compositions. Each composition was then spread on a one inch square surface of each of two blocks of oakwood with the aid of a doctor blade having a clearance of 0.005 inch. The adhesive coated surfaces of the blocks were united and the joined blocks were placed in a constant temperature room set at 77° F. The adhesive gelled in the time noted in the table. After 6 days, the united blocks were subjected to the block shear test of the Army-Navy-Civil Committee on Aircraft Design Criteria: "Wood Aircraft Inspection and Fabrication" ANC–19 (Dec. 20, 1943) discussed in an article by R. C. Rinker and G. M. Kline, Modern Plastics, vol. 23, p. 164, 1945. The shear strengths of the joined blocks were as tabulated below. Also given are the percentages for glue line failure which is indicative of that portion of the failure which occurred in the adhesive as compared with that resulting from shearing of the wood itself. Thus, in the blocks joined with the composition containing 50 parts of extract per 100 parts of epoxy resin, there was a 20% glue line failure which means that 20% of the area in break was in the adhesive and 80% in the wood. It is evident from the results that this 50–100 mixture gave the strongest and most satisfactory adhesive.

| Parts Extract A per 100 parts epoxy resin of Example I | Gel time, minutes | Shear strength, lbs./in.² | Percentage glue line failure |
|---|---|---|---|
| 25 | 18 | 1,690 | 40 |
| 50 | 32 | 1,890 | 20 |
| 75 | 59 | 840 | 100 |
| 100 | 68 | 410 | 100 |

The phenolic pitch described herein is also useful as a coloring and film-forming agent when mixed with other resins such as shellac, zein and polyvinyl acetals like polyvinyl formal or butyral. It is a useful ingredient in ordinary oil varnishes and nitrocellulose lacquers.

The invention claimed is:

1. A composition of matter comprising an epoxy ether having a 1,2-epoxy equivalency greater than 1, and in admixture therewith an appreciable proportion of phenolic pitch consisting of a semi-solid to solid aqueous alkali extract of cracked petroleum.

2. A composition of matter comprising a glycidyl polyether having a 1,2-epoxy equivalency greater than 1 in admixture with about 1% to about 50% of phenolic pitch consisting of an aqueous alkali extract of cracked petroleum, said pitch boiling above 250° C., but having a ring and ball softening point in water below 100° C.

3. A composition of matter comprising a glycidyl polyether of bis-(4-hydroxyphenyl)-2,2-propane having a 1,2-epoxy equivalency greater than 1 in admixture with about 1% to about 50% of phenolic pitch consisting of a semi-solid to solid aqueous alkali extract of cracked petroleum.

4. A composition of matter comprising a glycidyl polyether having a 1,2-epoxy equivalency greater than 1 and having a Durran's method melting point above 30° C. in admixture with about 1% to about 50% of phenolic pitch consisting of an aqueous alkali extract of cracked petroleum, said pitch boiling above 250° C., but having a ring and ball softening point in water below 100° C.

5. A composition of matter comprising a glycidyl polyether of bis-(4-hydroxyphenyl)-2,2-propane having a 1,2-epoxy equivalency greater than 1 and having a Durran's method melting point above 30° C. in admixture with 1 to 20% of phenolic pitch consisting of an aqueous alkali extract of cracked petroleum oil, said pitch having a ring and ball softening point in water of 30° C. to 60° C.

6. A composition of matter fluid at 20° C. which comprises a glycidyl polyether of bis-(4-hydroxyphenyl)-2,2-propane having a 1,2-epoxy equivalency greater than 1 and having a Durran's method melting point above 30° C. in admixture with a proportion giving fluidity to the mixture at 20° C. of a phenolic pitch consisting of an aqueous alkali extract of cracked petroleum, said pitch being liquid at 20° C. and boiling above 250° C.

THEODORE F. BRADLEY.

REFERENCES CITED

The following references are of record in the file of this patent:

UNITED STATES PATENTS

| Number | Name | Date |
|---|---|---|
| 2,203,217 | Hund et al. | June 4, 1940 |
| 2,324,483 | Castan | July 20, 1943 |